(12) United States Patent
Fischer et al.

(10) Patent No.: US 7,985,925 B2
(45) Date of Patent: Jul. 26, 2011

(54) SUPERCONDUCTING CABLE AND METHOD FOR THE PRODUCTION THEREOF

(75) Inventors: Egbert Fischer, Darmstadt (DE); Hamlet Khodghibagiyan, Moscow Region (RU); Alexander Kovalenko, Moscow Region (RU); Gebhard Moritz, Darmstadt (DE)

(73) Assignee: GSI Helmholtzzentrum Fuer Schwerionenforschung GmbH, Darmstadt (DE)

( * ) Notice: Subject to any disclaimer, the term of this patent is extended or adjusted under 35 U.S.C. 154(b) by 114 days.

(21) Appl. No.: 11/578,851

(22) PCT Filed: Apr. 22, 2005

(86) PCT No.: PCT/EP2005/004420
§ 371 (c)(1),
(2), (4) Date: Jan. 24, 2007

(87) PCT Pub. No.: WO2005/104143
PCT Pub. Date: Nov. 3, 2005

(65) Prior Publication Data
US 2007/0227760 A1    Oct. 4, 2007

(30) Foreign Application Priority Data

Apr. 23, 2004    (EP) .................................... 04009730

(51) Int. Cl.
*H01B 12/00*    (2006.01)
(52) U.S. Cl. ..................... 174/125.1; 29/599; 505/230
(58) Field of Classification Search ............... 174/125.1, 174/15.4, 15.5; 29/599
See application file for complete search history.

(56) References Cited

U.S. PATENT DOCUMENTS
3,623,221 A    11/1971    Barber et al.
(Continued)

FOREIGN PATENT DOCUMENTS
JP    11235009 A    8/1999
(Continued)

OTHER PUBLICATIONS

CHATS-2002 Workshop on Computation of Thermohydraulic Transients in Superconductors; Sep. 16-18, 2002, Karlsruhe, Germany, Cyrogenics 43, pp. 139-140.
L. Bottura et al., "An analytical benchmark for the calculation of current distribution in superconducting cables", Cyrogenics 43, 2003, pp. 241-248.
L. Bottura et al., "Flower, a model for the analysis of hydraulic networks and processes", Cyrogenics 43, 2003, pp. 215-233.
(Continued)

*Primary Examiner* — Ishwarbhai B Patel
(74) *Attorney, Agent, or Firm* — Leydig, Voit & Mayer, Ltd.

(57) ABSTRACT

The present invention relates to a superconducting hollow cable and a method for the production thereof. The superconducting hollow cable (1) has an outer tube (2) which has a circular inner cross-section and a cylindrical inner wall (3). In addition, the superconducting hollow cable (1) has a central cooling channel (4) of a polygonal or circular cross-section that is, however, smaller than the inner cross-section of the outer tube (2). Arranged between the outer tube (2) and the cooling channel (4) are profiled superconducting wires (5). These profiled superconducting wires (5) have a cross-sectional profile which corresponds to a key stone as known for Roman stone bridges or for groin vaults. For the purpose, the cross-sectional profile has at least one outer region (7) of curvature and an inner region (8), the outer region (7) of curvature being matched to the inner radius of the outer tube (2) and the inner region (8) being matched to the cooling channel (4). The side edges (12, 13) too can be profiled either rectilinearly towards the center-point (11) of the cooling channel (4) or by means of an offset from that rectilinearity.

12 Claims, 12 Drawing Sheets

U.S. PATENT DOCUMENTS

| | | | |
|---|---|---|---|
| 4,327,244 A | 4/1982 | Horvath et al. | |
| 5,347,085 A * | 9/1994 | Kikuchi et al. | 505/231 |
| 6,271,474 B1 * | 8/2001 | Fujikami et al. | 174/125.1 |
| 6,357,105 B1 * | 3/2002 | Hikata et al. | 29/599 |
| 6,448,501 B1 * | 9/2002 | McIntyre et al. | 174/125.1 |
| 6,675,623 B2 | 1/2004 | Wada et al. | |
| 7,735,212 B1 * | 6/2010 | Willen | 29/599 |
| 2003/0024730 A1 | 2/2003 | Otto et al. | |
| 2003/0164245 A1 | 9/2003 | Areskoug | |

FOREIGN PATENT DOCUMENTS

| | | |
|---|---|---|
| JP | 11329114 A | 11/1999 |
| RU | 2027236 C1 | 1/1995 |
| SU | 1612820 A1 | 9/1994 |

OTHER PUBLICATIONS

Bottura et al., Analysis of Electrical Coupling Parameters in Superconducting Cables. Presented at the 5th Workshop on Computation of Thermo-Hydraulic Transients in Superconductors (CHATS 2002), Sep. 16-18, 2002, Karlsruhe, Germany.

Khodzhibagiyan et al., Design of New Hollow Superconducting NBTI Cables for Fast Cycling Synchrotron Magnets, IEEE Transactions on Applied Superconductivity, vol. 13, No. 2, Jun. 2003.

H. Khodzhibagiyan et al., "Design and test of new hollow high current NbTi cable for fast ramped synchrotron magnets", Proc. EUCAS 2003, Sorrento, Sep. 2003, pp. 523-528.

* cited by examiner

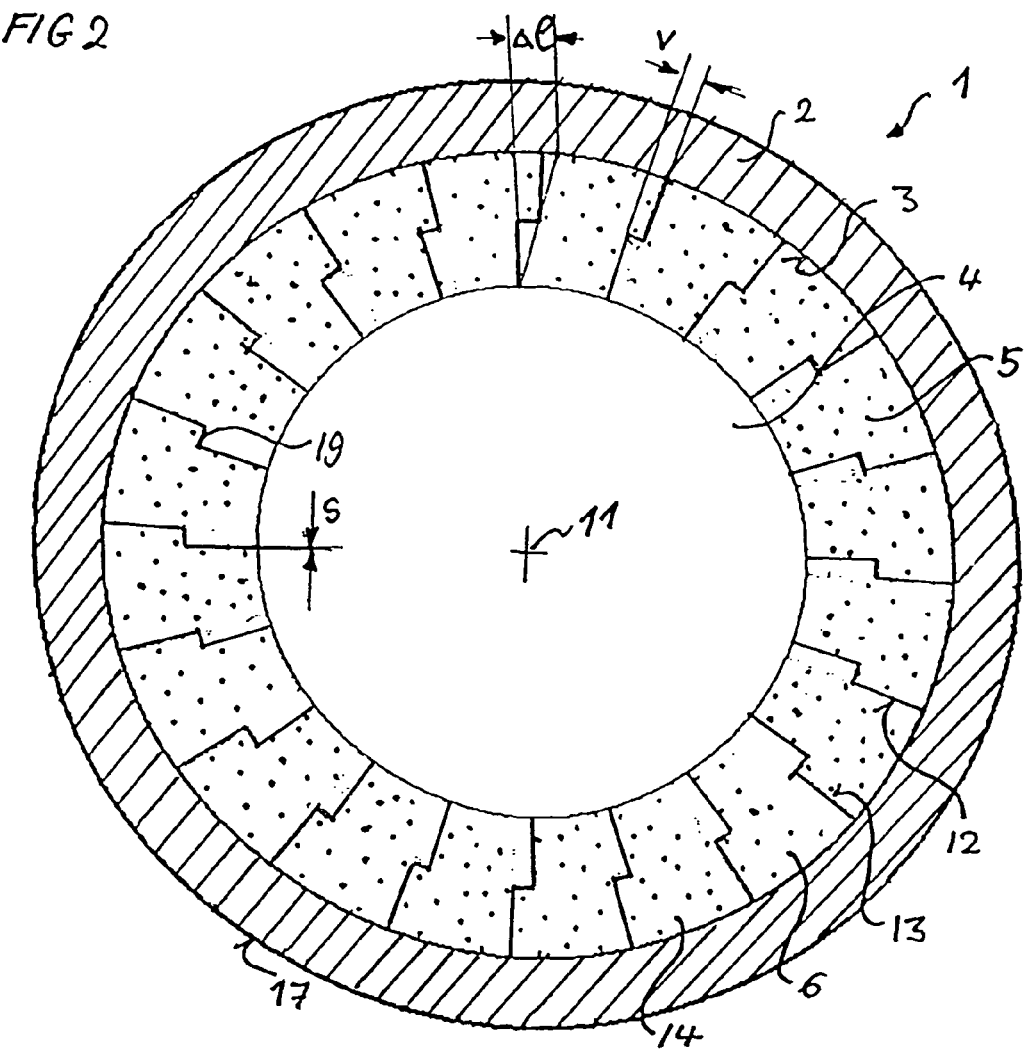
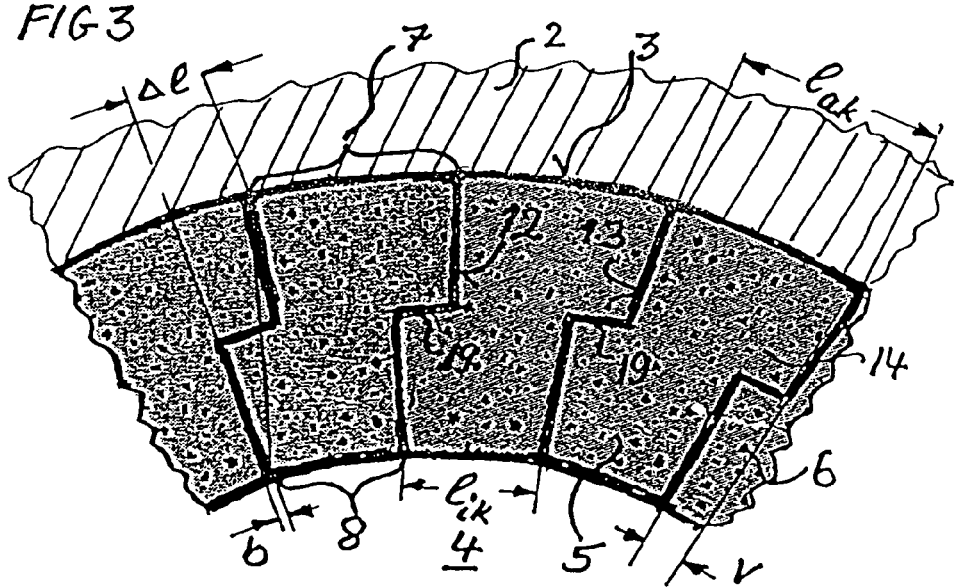

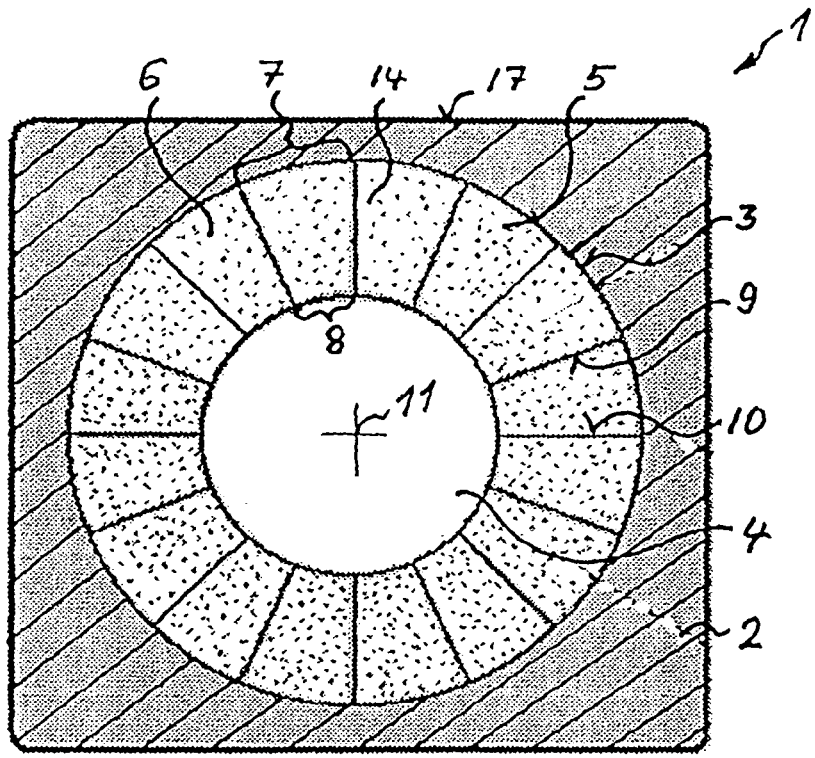
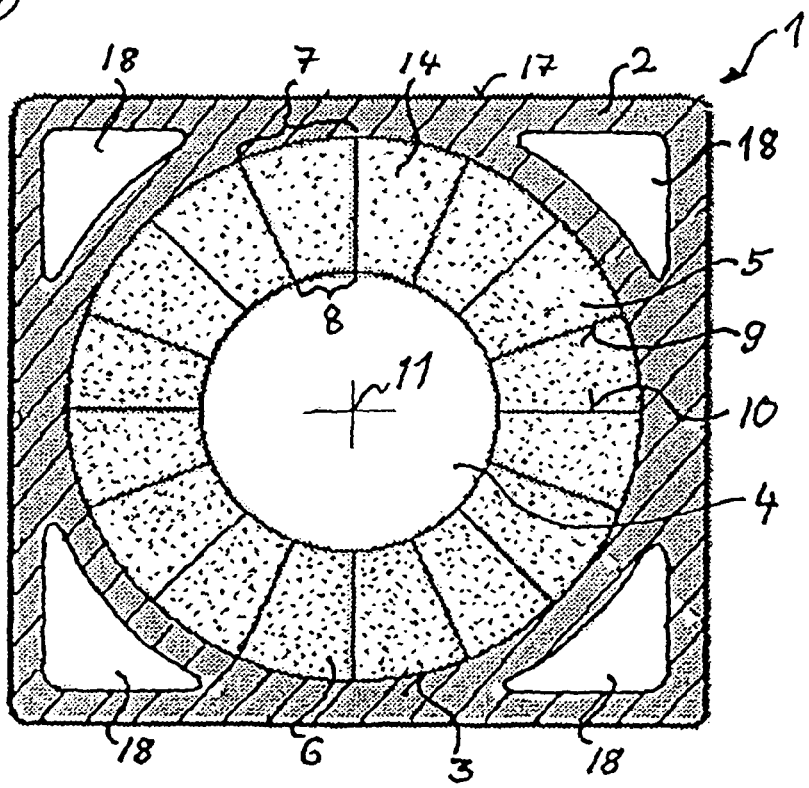

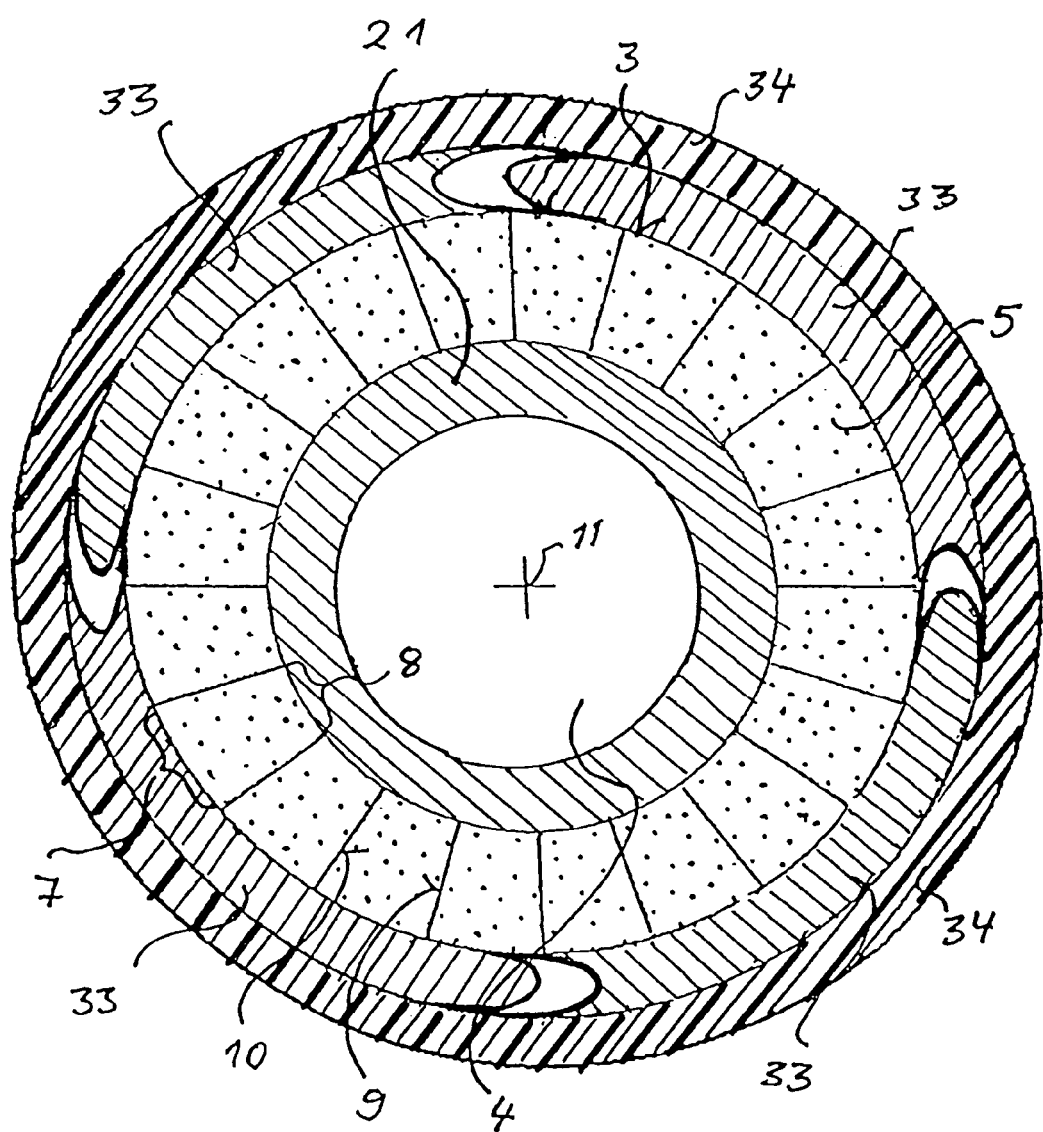

US 7,985,925 B2

SUPERCONDUCTING CABLE AND METHOD FOR THE PRODUCTION THEREOF

CROSS-REFERENCE TO RELATED APPLICATIONS

This application is a 371 of PCT/EP2005/004420 filed on Apr. 25, 2005, published on Nov. 3, 2005 under publication number WO 2005/104143 A1 which claims priority benefits from European Patent Application Number 04009730.5 filed Apr. 23, 2004.

BACKGROUND OF THE INVENTION

1. Field of the Invention

The invention relates to a superconducting hollow cable having an outer tube which has a circular inner cross-section and, consequently, a cylindrical inner wall. In addition, the superconducting hollow cable has a central cooling channel of a circular cross-section that is smaller than the inner cross-section of the outer tube. Arranged between the inner wall of the outer tube and the cooling channel are profiled superconducting wires. Such profiled superconducting wires comprise at least one superconductor (superconducting filament) and have a cross-sectional profile of a key stone as known for Roman stone bridges or for groin vaults.

2. Description of Related Art

Profiled superconducting cables having a cross-sectional profile of a key stone are known from the publication U.S. Pat. No. 6,675,623 B2. Further prior art is US 2003/0024730. The known key-stone-shaped superconducting cables consist of superconducting wires of round cross-section stranded with one another and, after stranding, they are given a trapezoidal shape with the aid of profiling rollers.

The structure of a superconducting hollow cable of the Nuclotron type having round (standard variant, FIG. 16) or profiled (improved Nuclotron cable, FIG. 17) superconducting wires is known from the publication "Design and test of new hollow high current NbTi cable for fast ramped synchrotron magnets" Proc. EUCAS 2003, Sorrento, September 2003, H. Khodzhibagiyan et al. In the case of the known hollow cable, first a cooling channel is formed by means of providing a compact metallic inner tube of CuNi. Superconducting wires profiled in the longitudinal direction and having a key-stone-shaped cross-section are placed or wound on the outer wall of the inner tube. In order to fix the superconducting wires on the compact inner tube, NiCr wires are wound around the outside of the superconducting wires radially or in a helical arrangement. A Kapton tape wound over the NiCr wires forms a protective outer jacket. A fibreglass tape wound around the outer jacket ensures that the superconducting hollow cable is electrically insulated.

A superconducting hollow cable that is so structured has the advantage, amongst others, of being able to compensate for high dynamic loads as occur as a result of the Lorentz forces in fast-pulsed magnets and high magnetic fields. The heat sources brought about by those pulsating fields by means of eddy currents, hysteresis cycles, mechanical stress fields and other external influences (e.g. ion beams) can, in continuous operation, be very effectively cooled by the inner cooling channel by virtue of the compact inner tube. The relatively large cross-section of the compact inner tube, which has a smooth surface, allows a high throughput of coolant with low frictional resistance and, accordingly, a low pressure drop in the two-phase helium stream. In addition, all the superconducting wires are arranged absolutely symmetrically and are consequently under identical operating conditions, as a result of which degradation of the critical current of the cable with increasing electromagnetic loading is avoided to a very large extent.

This arrangement of the superconducting wires furthermore results in low cable inductivity and consequently (inter alia) also in reduction of the energy stored.

Another cable type is, in general, preferred when the coil system to be produced is not intended to be operated in an extremely fast-pulsed regime but rather has to store a large amount of inductive energy which has to be delivered in high stochastic heat pulses of short duration. In that case, a continuous high cooling performance is secondary whereas the fastest possible heat transfer to the heat capacity of the helium cooling the superconducting wires in the millisecond range is primarily sought. For that task, the known hollow cables of the CICC type as shown in FIG. 14 were developed.

However, because those cables also increasingly have to overcome higher mechanical and thermal loads in practical use, further development thereof resulted in a high-current cable of the CICC type having as a result of additional constructional elements, complicated cooling with two basically different cooling circuits with supercritical helium in the outer cooling circuit and with two-phase helium in the central cooling channel.

That complicated structure not only has technical and, therefore, cost-influencing disadvantages but also automatically gives rise to a reduced average current density of the hollow cable. A cable of such a kind in accordance with the present prior art is shown in FIG. 15 and is known as a POLO cable (see, for example, "CHATS", FzK, Karlsruhe, September 2002, L. Bottura et al.). It represents the starting point for the invention explained hereinbelow.

The problem of the invention is to overcome the disadvantages in the prior art and to provide a superconducting hollow cable which makes possible intensive cooling of the superconducting components and; in addition, makes available a high current density for a hollow cable of the CICC type with a compact and mechanically stable structure for the hollow cable. Solutions are to be provided as to how the disadvantages of the CICC cable with respect to the cable of the Nuclotron type can be overcome to a very large extent and how the advantages of both hollow cable types can be, as far as possible, in a new superconducting hollow cable.

The problem is solved by the subject-matter of the independent claims. Advantageous developments arise out of the dependent claims.

SUMMARY OF THE INVENTION

In accordance with the invention, a hollow cable is provided which has an outer tube having a circular inner cross-section and a cylindrical inner wall. In the centre of the superconducting hollow cable there is arranged a central cooling channel of a polygonal or circular cross-section which is smaller than the inner cross-section of the outer tube. Arranged between the inner wall and the cooling channel are profiled superconducting wires. These profiled superconducting wires have at least one superconducting filament (usually in a Cu matrix). Furthermore, the superconducting wires have a cross-sectional profile of a key stone.

The cross-sectional profile of the profiled superconducting wires have an outer region of curvature which is matched to the circular inner cross-section of the outer tube. Furthermore, the cross-section of the profiled superconducting wires have an inner region of curvature which is in turn matched to the circular cross-section of the cooling channel. Finally, the cross-sectional profile has side edges which are oriented profiled towards the centre-point of the cooling channel. The profiled superconducting wires are accordingly arranged on the inner wall of the outer tube and their inner regions form the cooling channel of the superconducting hollow cable.

In summary it can be mentioned that the superconducting cable has three main elements, which have the following advantages. First, the superconducting filaments are minimised, as a result of which the Meissner effect and the alternating current losses are minimised. Second, as large a number of filaments as possible is embedded in a metallic matrix which mechanically stabilises the filaments and ensures a high degree of heat conduction. Third, a number of superconducting wires are combined and mechanically stabilised in the superconducting cable and contact with the coolant is brought about. Electrically insulated from one another, the superconducting wires according to the invention, with a resistance barrier, form the basic material for producing actual coil elements. Because the wires are not fused with one another, the coils and/or cables are extremely flexible.

Such a superconducting hollow cable according to the invention has, amongst others, the following advantages:

The profiled superconducting wires are so arranged tightly against one another and matched to the inner wall of the outer tube that they can hold themselves in position by means of a shape-based and force-based fit without the inner tube known from the prior art and they result in a cylindrical body, the space within which forms the cooling channel. This is to say that inner structural elements are no longer required for mechanically fixing the superconducting wires in place. In addition to the material saving resulting from dispensing with a component, this superconducting hollow cable has the further advantage that the larger cross-section of the cooling channel brings about a reduction in resistance to the flow of the cooling medium. As a result, a greater effect can be achieved. Alternatively, that additional free volume can also be utilised for larger superconducting wires and, consequently, for a higher average current density.

Finally, the cooling medium, or cooling channel, is in direct contact with the profiled superconducting wires. Even though that contact is also present in the above-described CICC cables, the resistance to flow in the cooling strands therein is considerable and the heat capacity of the small amount of supercritical helium is limited so that the cooling effects achievable with the hollow cable according to the invention are much greater in all time intervals (short heat pulses and continuous loading). The symmetrical arrangement of all superconducting wires ensures that the cable as a whole has additional stability against thermal pulses, as described above for the Nuclotron cable. From the cryotechnical point of view, the now dramatically simplified cooling, compared to the starting point, constitutes a decisive advantage because this means that two cooling circuits, and indeed two qualitatively different cooling circuits, are no longer required and cooling performance is improved by orders of magnitude in all time scales (pulse operation to constant continuous operation).

The profiled superconducting wires are arranged so tightly on the inner wall of the outer tube of the superconducting hollow cable by means of their outer regions of curvature and with their radially oriented side edges adjacent to one another that at all operating temperatures of the superconducting hollow cable they maintain a central cooling channel with their inner regions of curvature. Because such a superconducting hollow cable undergoes extreme temperature differences from room temperature to a few degrees kelvin in its operation, the tight structure of the key-stone-shaped profiled superconducting wires means that the central cooling channel is maintained despite the different operating temperatures. For that purpose, the sum of gap widths that possibly form between the profiled superconductors during operation is, at all operating temperatures of the superconducting hollow cable, smaller than the difference in length $\Delta l$ between the outer and inner regions of curvature of an individual profiled superconductor. In this context, $$\Delta l = 2\pi(r_a - r_i)/n,$$

n being the number of profiled superconductors distributed on the inner wall of the outer tube, $r_a$ being the inner radius of the outer tube and $r_i$ being the inner radius of the flow channel. Because the length $l_{ak}$ of an outer curvature radius $$l_{ak} = 2\pi r_a / n$$

and the length $l_{ik}$ of the inner region of curvature of a profiled superconductor $$l_{ik} = 2\pi r_i,$$

the following conditions must be satisfied at all operating temperatures of the superconducting hollow cable:

$$n \cdot s < \Delta l \text{ or}$$

$$n \cdot s < l_{ak} - l_{ik}$$

and accordingly the condition is to be met $$s < 2\pi(r_a - r_i)/n^2.$$

so that the central cooling channel is maintained. Accordingly the number of profiled superconducting wires is dependent on the manufacturing tolerance and must, where necessary, be kept as small as possible in order that the resulting gap width s can be allowed in the case of large tolerances. In general, in order to reduce the influence of eddy currents, the two main dimensions of the cross-section of the profiled superconducting wires should not differ too greatly from one another. The likewise undesirable heat production due to mechanical stress and deformation fields can be minimised by means of manufacture with a shape-based fit, where appropriate with biasing.

In a further embodiment of the invention, the profiled superconducting wires have intermeshing profiled side edges. Whereas the above observations are provided and deduced for the formation of a central cooling channel from profiled superconductors having rectilinear side edges of the cross-section of the profiled superconductors, those side edges pointing in towards the centre of the hollow cable, a further possibility is provided by this further embodiment of the invention, in which the side edges too are profiled and do not extend in a straight line towards the centre-point, of increasing the safety margin for maintaining the central cooling channel, especially as—in addition to the above-mentioned difference in length $\Delta l$ for the sum $s \cdot n$ of all gap widths s—the offset due to the profiled side edges also comes into play. As a condition for the allowable gap width s, that offset, of a magnitude v, results in the value $$s < (\Delta l + v)/n.$$

The accompanying FIGS. 2 and 4 show two embodiments of profiled superconductors having profiled side edges and the respective offset of magnitude v.

In a further embodiment of the invention, the outer tube is of two layers. A first layer comprises one or more tensioning wires wound in a helical arrangement around a bundle of superconducting profiled wires. A second layer comprises an electrically insulating and hermetically sealing outer layer.

This tensioning wire solution has the advantage that superconducting hollow cables of any desired length can be produced continuously.

In a further embodiment of the invention, the profiled superconducting wires comprise stranded or twisted superconducting filaments. Examples of embodiments of such profiled superconducting wires are shown in the further FIGS. 6, 7 and 8 and are explained later. The superconducting filaments are provided with a ductile metallic core and a ductile metallic jacket so that that the superconducting wires are accessible to profiling shaping. For the purpose, the profiled superconducting wires comprise a metallic matrix (having a metallic core or centre, usually of Cu) and, for reducing eddy currents, optionally additional high-resistance intermediate layers, for example of CuNi alloys. The superconducting filaments consist of, for example, NbTi wires, which are twisted or stranded with one another. The jacket likewise preferably comprises a CuNi alloy.

In a further embodiment of the invention, the profiled superconducting wires are ceramic or high-temperature superconductors. Such HTSC's have the advantage that their critical temperature is substantially higher than in the case of metallic superconductors. The critical temperature in the case of metallic superconductors is below 20 degrees kelvin. With the HTSC's, the critical temperatures are in some cases above 80 degrees kelvin, associated with which is the advantage that substantially cheaper coolants can be used or higher magnetic fields can be achieved at lower temperatures. Even if the processing of HTSC's into profiled superconducting wires is more difficult, it is nevertheless to be foreseen that the so-called YBCO-based ceramic superconductors based on $Y_3O_3$, $BaCO_3$ and CuO with admixtures of silver oxide, platinum oxide or cerium oxide can certainly be processed into profiled superconducting wires by means of appropriate melting and annealing processes. Even the so-called BSCCO superconductors, which consist of bismuth oxides, strontium oxides, calcium oxides and copper oxides and may comprise additions of lead oxides, comprise up to 90% superconducting orthorhombic material, which can be processed into profiled superconducting wires.

The outer tube of the superconducting hollow cable is made from a metallic or non-metallic material, such as a CuNi alloy, stainless steel, GFRP or organic material and can have a circular, square or trapezoidal external contour or any other shape required. The outer tube in question can be wound in appropriate Kapton tapes and/or fibreglass tapes for electrical insulation. The square external contour has the advantage that cooling channels can be incorporated within the outer tube in the longitudinal direction so that not only are the profiled key-stone-shaped superconducting wires cooled by the central cooling channel, which is in direct contact with the superconductors, but also, in addition, they can additionally be cooled by the outer tube or the cooling channel running through the outer tube in the longitudinal direction. The same also applies to trapezoidal external contours because, in that case too, for example, four additional cooling channels can be provided directly in the outer tube material.

The outer cooling channels can be open along the inner wall of the outer tube over a finite width $\sim l_{ak}$.

The twisted profiled superconducting wires cross those channels at an angle that is not too acute and accordingly after each quarter turn of the helical displacement are additionally cooled from the outside in direct contact with the coolant.

Accordingly, in this variant too, all the wires are subject to identical electromagnetic, mechanical and thermal conditions.

Depending on the production technology (with or without mechanical biasing) and conditions of use, it is possible to provide, as the material for the outer tube, a material which has a higher or lower coefficient of thermal expansion than the material of the profiled superconducting wires. Where appropriate, the properties of the material of the outer tube are matched to the properties of the superconducting material in order to ensure that the shape and integrity of the central cooling channel are preserved. A further crucial material selection criterion for the outer tube is high electrical resistance to eddy currents whilst having sufficiently high mechanical strength.

Methods of producing a superconducting hollow cable can comprise a plurality of method steps in different orders. Furthermore, the method of producing a superconducting hollow cable according to the invention is also dependent on the possibilities for producing profiled superconducting wires.

One of the methods, according to the invention, of producing a superconducting hollow cable comprises the following method steps. First, a compact outer tube having a circular inner cross-section and a cylindrical inner wall that is as smooth as possible is produced. Aside therefrom, profiled superconducting wires having a cross-sectional profile of a key stone as known for Roman stone bridges or for groin vaults are produced. For the purpose, the cross-sectional profile of the profiled superconducting wires have an outer region of curvature which is matched to the circular inner cross-section of the outer tube. Furthermore, the cross-sectional profile has an inner region of curvature which is matched to the circular cross-section of the cooling channel.

Finally, the cross-sectional profile has side edges which are oriented profiled towards the centre-point of a cooling channel to be formed.

After those two main components of the hollow cable according to the invention have been produced, the profiled superconducting wires are first brought together to form a longitudinally extended circular bundle around a central cooling channel. In the course of that bringing together, aids such as adhesive substances can also be used in order to ensure a material-based connection between the profiled superconducting wires. That circular bundle comprising profiled superconducting wires is then drawn into the compact outer tube of the superconducting hollow cable. This method has the advantage that the hollow cable can be assembled from two components which can be produced independently of one another.

In a further method variant, the outer tube is not produced in the form of a compact component but rather is fabricated in two half-shells. On assembly of the superconducting hollow cable, the profiled superconducting wires produced are then placed inside the half-shells. The half-shells are subsequently brought together with profiled superconductors lying inside and welded together. This method has the advantage that, after the welding process, contraction of the outer tube can occur which simultaneously brings about compressive compaction of the profiled superconducting wires lying inside.

In a further method variant, tensioning wires are wound in a helical arrangement around a bundle of profiled superconducting wires, preferably contrary to the twist direction of the superconducting wires. An electrically insulating and hermetically sealing outer layer is subsequently applied over the tensioning wires. This method variant has the advantage that unlimitedly long superconducting hollow cables comprising profiled superconducting wires can be continuously produced.

A further method variant provides the possibility of heating the outer tube in the form of a compact component and cooling a bundle of profiled superconducting wires having a central cooling channel. The two components are then pushed one into the other. Afterwards the outer tube shrinks onto the circular bundle of longitudinally extended profiled superconducting wires and causes the superconducting wires to press against one another whilst forming a central cooling channel. This method has the advantage that drawing-in of the circular bundle of superconducting wires having a central cooling channel into the compact outer tube is made easier. In this context it is also possible for only the solidly constructed outer tube to be heated or for only the bundle of profiled superconducting wires to be cooled.

A preferred method of producing profiled superconducting wires comprises the following method steps. First, in the standard method, superconducting multifilament wires of round cross-section are produced which, in accordance with the intended conditions of use, have an optimum microstructure, where appropriate with additional resistive barriers. Subsequently, the round superconducting wires are profiled to form profiled superconducting wires. That profiling can be carried out in a great variety of ways.

On the one hand it is possible to use appropriate profile rollers, which produce the inner region of curvature and the outer region of curvature as well as the key stone shape of the side faces. It is furthermore possible also to use profile rollers for the side edges in order to provide an offset in the side edges, so that the profiled superconducting wires intermesh to a greater extent on assembly into a bundle having a central cooling channel. Instead of profile rollers it is also possible to provide profile drawing through an appropriate profile block, through which the prepared wire is drawn and by means of which, in the process, the shape of its cross-sectional profile is modified. A further possibility lies in so-called reshaping forging, in which the desired profile is produced by means of appropriate forging procedures.

Instead of a solidly constructed outer tube, jacketing of the profiled superconducting wires can also be accomplished using helically wound tensioning wire, for example made of NiCr, FIG. 13: The electrically insulating, hermetically tight outer layer is subsequently produced, for example by means of polymerisation.

In accordance with one embodiment, the invention accordingly relates to a superconducting hollow cable having the following features:
  an outer tube (2) having a circular inner cross-section and a cylindrical inner wall (3);
  a central cooling channel (4) having a polygonal or circular cross-section which is smaller than the inner cross-section of the outer tube (2), there being arranged between the inner wall (3) and the cooling channel (4) profiled superconducting wires (5);
  profiled superconducting wires (5) which comprise at least one superconducting filament (6) and which have a cross-sectional profile of a key stone as known for Roman stone bridges or for groin vaults,
  characterised in that
  the cross-sectional profile of the profiled superconducting wires (5) has an outer region (7) of curvature which is matched to the polygonal or circular inner cross-section of the outer tube (2) and an inner region (8) of curvature which is matched to the circular cross-section of the cooling channel (4), and the cross-sectional profile has side edges (9, 10) which are oriented profiled towards the centre-point (11) of the cooling channel (4), the profiled superconducting wires (5) being arranged on the inner wall (3) of the outer tube (2), and the inner regions (8) of the profiled superconducting wires (5) forming the cooling channel (4) of the superconducting hollow cable (1).

The superconducting hollow cable can be characterised in that the profiled superconducting wires (5) are arranged so tightly on the inner wall (3) of the outer tube (2) of the superconducting hollow cable (1) by means of their outer regions (7) of curvature and with their radially oriented side edges (9, 10) adjacent to one another that at all operating temperatures of the superconducting hollow cable (1) they maintain a central cooling channel (4) with their inner regions (8) of curvature.

This superconducting hollow cable can be characterised in that the sum of gap widths (s) of possible radial gap formations between the profiled superconducting wires (5) is, at all operating temperatures of the superconducting hollow cable (1), smaller than the difference in length ($\Delta l$) between the outer (7) and inner (8) regions of curvature of an individual profiled superconducting wire.

Furthermore, the superconducting hollow cable can be characterised in that the profiled superconducting wires (5) have intermeshing profiled side edges (12, 13).

Furthermore, the superconducting hollow cable can be characterised in that the profiled superconducting wires (5) have special surface coatings or partial high-resistance jacketing means in order to reduce eddy current effects and thermal losses.

Furthermore, the superconducting hollow cable can be characterised in that the profiled superconducting wires (5) are twisted around the central cooling channel.

Furthermore, the superconducting hollow cable can be characterised in that the profiled superconducting wires (5) have ceramic superconductors or high-temperature superconductors.

Furthermore, the superconducting hollow cable can be characterised in that the outer tube (2) has a circular, square or trapezoidal external contour (17).

Furthermore, the superconducting hollow cable can be characterised in that the outer tube (2) comprises cooling channels (18) in its longitudinal direction.

Furthermore, the superconducting hollow cable can be characterised in that the coefficient of thermal expansion of the material of a compact outer tube (2) is greater than the coefficient of thermal expansion of the profiled superconductors (5).

In accordance with a further embodiment, the invention relates also to a method of producing a superconducting hollow cable (1), which comprises the following method steps:
  producing an outer tube (2) having a circular inner cross-section and a cylindrical inner wall (3);
  producing profiled superconducting wires (5) having a cross-sectional profile of a key stone as known for Roman stone bridges or for groin vaults, the cross-sectional profile of the profiled superconducting wires (5) having an outer region (7) of curvature which is matched to the circular inner cross-section of the outer tube (2) and having an inner region (8) which is matched to the polygonal or circular cross-section of a central cooling channel (4), and the cross-sectional profile having side edges (9, 10) which are oriented profiled towards the centre-point (11) of a cooling channel (4) to be formed;
  bringing together the profiled superconducting wires (5) to form a longitudinally extended circular bundle (28) around a central cooling channel (4);
  drawing the circular bundle (28) having a central cooling channel (4) into the outer tube (2).

In accordance with a further embodiment, the invention relates also to a method of producing a superconducting hollow cable (1), which comprises the following method steps:

producing profiled superconducting wires (5) having a cross-sectional profile of a key stone as known for Roman stone bridges or for groin vaults, the cross-sectional profile of the profiled superconducting wires (5) having an outer region (7) of curvature which is matched to the circular inner cross-section of the outer tube (2) and having an inner region (8) which is matched to the polygonal or circular cross-section of a central cooling channel (4), and the cross-sectional profile having side edges (9, 10) which are oriented profiled towards the centre-point (11) of a cooling channel (4) to be formed;

bringing together the profiled superconducting wires (5) to form a longitudinally extended circular bundle (28) around a central cooling channel (4);

winding at least one tensioning wire around the bundle in a helical arrangement;

covering the wound-around tensioning wire with an electrically insulating and hermetically sealing outer layer of the superconducting hollow cable.

In accordance with a further embodiment, the invention relates also to a method of producing a superconducting hollow cable (1), which comprises the following method steps:

producing two half-shells of a compact outer tube (2) having a circular inner cross-section and a cylindrical inner wall (3);

producing profiled superconducting wires (5) having a cross-sectional profile of a key stone as known for Roman stone bridges or for groin vaults, the cross-sectional profile of the profiled superconducting wires (5) having an outer region (7) of curvature which is matched to the circular inner cross-section of the outer tube (2) and having an inner region (8) which is matched to the polygonal or circular cross-section of a central cooling channel (4), and the cross-sectional profile having side edges (9, 10) which are oriented profiled towards the centre-point (11) of a cooling channel (4) to be formed;

bringing together the profiled superconducting wires (5) to form a longitudinally extended circular bundle (28) around a central cooling channel (4);

bringing together the half-shells, with the bundle lying inside, to form a compact outer tube of the superconducting hollow cable.

Those methods of producing profiled superconducting wires for a superconducting hollow cable can comprise the following method step:

profiling the round standard shape of superconducting wires (5).

Profiling of the wire can be accomplished by means of profile rollers.

Furthermore, profiling of the wire can be accomplished by means of a profile block.

Furthermore, profiling of the wire can be accomplished by means of reshaping forging.

Furthermore, an additional partial jacketing of the profiled superconducting wires by means of metal coating can be provided.

BRIEF DESCRIPTION OF THE DRAWINGS

The invention will now be explained in greater detail with reference to the accompanying Figures.

FIG. 2 shows a cross-section, in diagrammatic form, through a superconducting hollow cable according to a second embodiment of the invention;

FIG. 3 shows a cross-section, in diagrammatic form, through a detail of the superconducting hollow cable according to FIG. 2;

FIG. 9 shows a cross-section, in diagrammatic form, through a superconducting hollow cable according to a fourth embodiment of the invention;

FIG. 10 shows the cross-section, in diagrammatic form, through two variants of a superconducting hollow cable according to a fifth embodiment of the invention;

FIG. 17 shows a cross-section, in diagrammatic form, through a superconducting hollow cable of the Nuclotron type in an improved arrangement.

DETAILED DESCRIPTION OF THE EMBODIMENTS

Figure 1:
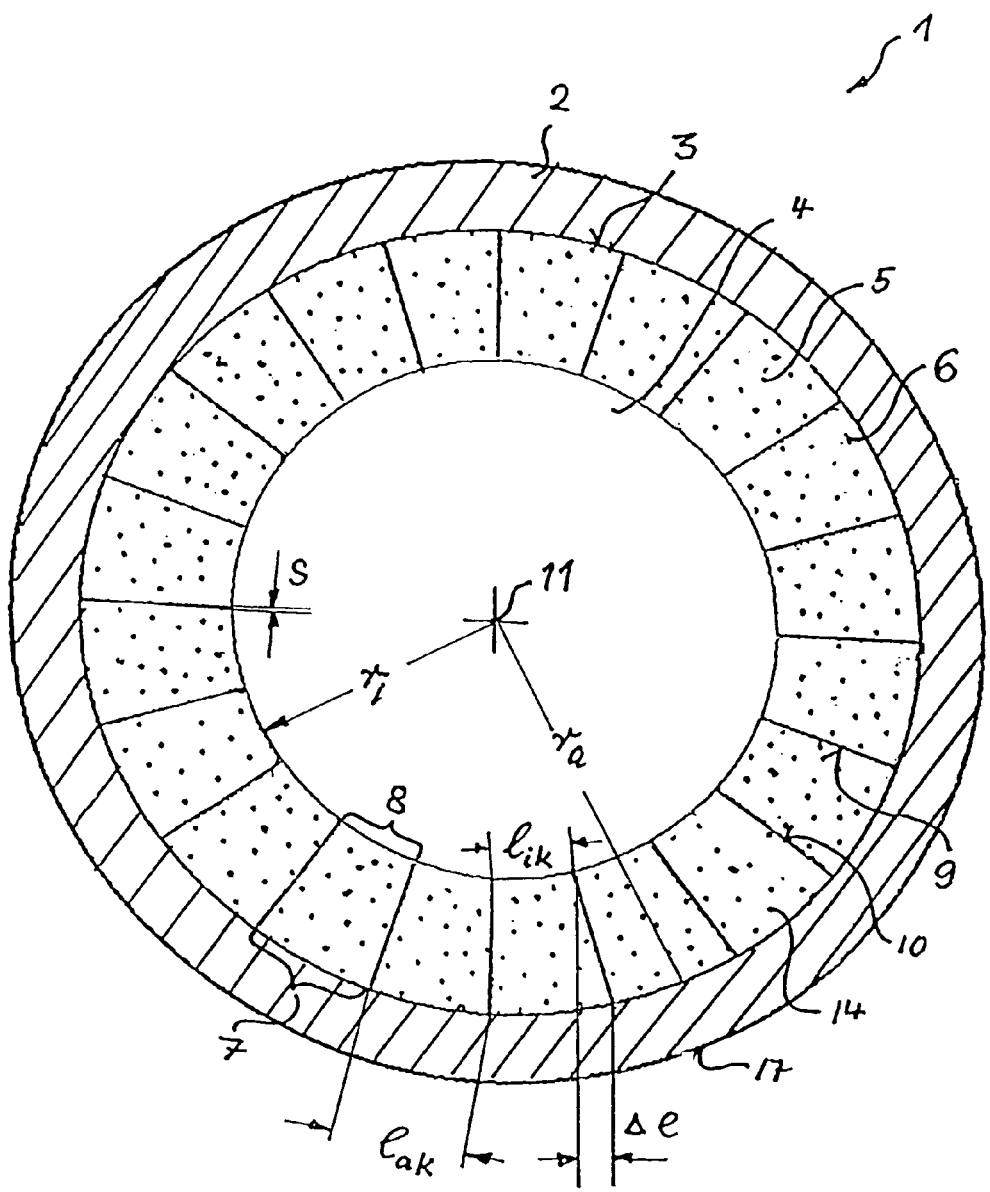
FIG. 1 shows a cross-section, in diagrammatic form, through a superconducting hollow cable according to a first embodiment of the invention.

FIG. 1 shows a cross-section, in diagrammatic form, through a superconducting hollow cable 1 according to a first embodiment of the invention. This hollow cable 1 has a central cooling channel 4, which is surrounded by profiled superconducting wires 5, which are usually twisted multifilament wires. In the cross-section shown here, these profiled superconducting wires 5 form a ring directly surrounding the central cooling channel 4 so that those profiled superconducting wires can be intensively cooled by the coolant stream. The profiled superconducting wires 5 are held together by a solidly constructed outer tube 2, which has an inner wall 3, against which the profiled superconducting wires 5 are in close abutment. The profiled superconducting wires 5 have a cross-section which corresponds to a key stone of a Roman bridge and/or of a Gothic vault.

This profile has an outer region 7 of curvature which is matched to the curvature of the inner wall 3 of the outer tube 2. Furthermore, the cross-section of the profiled superconducting wires 5 has an inner region 8 of curvature which is matched to the curvature of the central cooling channel 4. In this first embodiment of the invention, the profiled superconducting wires 5 have smooth side edges 9 and 10 which are oriented towards the centre-point 11 of the central cooling channel 4. The gap width s between side edges of adjacent superconducting wires 5 cannot be as large as may be desired because otherwise the annular structure of the profiled superconducting wires 5 and, as a result, the cooling channel 4 in operation is destroyed. The sum n·s of all gap widths s must therefore be less than the difference in length $\Delta l$ of the curvature length $l_{ak}$ of the outer region 7 of curvature minus the curvature length $l_{ik}$ of the inner region 8 of curvature of the profile of the profiled superconducting wires 5.

Because twenty profiled superconducting wires 5 are provided in this first embodiment of the invention, the gap width s that can be tolerated between the side edges of adjacent superconducting wires 5 is extremely limited. Also, this limitation is not least dependent on the difference between the inner radius $r_a$ of the outer tube 2 and the inner radius $r_i$ of the cooling channel 4, as explained in the formulae hereinbefore. A superconducting hollow cable 1 of such a kind has the advantage that the resistance to flow within the cooling channel 4 is extremely low and, as a result, a high cooling rate and high mechanical stability can be achieved. It furthermore has the advantage that the cooling medium directly contacts the profiled superconducting wires 5 and, accordingly, intensive cooling is ensured even for short heat pulses. Finally, this hollow cable has the advantage that it is made up of substantially only two layers or components: namely the concentric bundle of key-stone-shaped profiled superconducting wires 5 and the solidly constructed outer tube 2. Further thereto, for the purpose of (additional) electrical insulation, this superconducting hollow cable 1 according to the invention can have a Kapton tape wound around the external contour 17 of the outer tube 2 and, if necessary, further electrically insulating layers, for example of fibreglass tapes. This applies to all the variants corresponding to FIGS. 1, 2, 4, 9, 10, 11 and 12.

The hollow cable 1 of the second embodiment differs from the hollow cable 1 of the first embodiment in the profiling of the profiled superconducting wires 5. In addition to the key stone shape, these profiled superconducting wires 5 have an offset of magnitude v, which additionally improves the intermeshing of the profiled superconducting wires 5 and allows larger gap widths s between the adjacent profiled side edges 12 and 13 of these profiled superconducting wires 5. The relationship between the possible gap width s and the difference in length l between the outer and inner regions of curvature and the magnitude v of the offset has already been discussed in detail hereinbefore.

FIG. 3 shows a cross-section, in diagrammatic form, through a detail of the superconducting hollow cable 1 according to FIG. 2. Components having the same functions as in the preceding Figures are identified by the same reference symbols and not separately discussed. FIG. 3 shows, to an enlarged scale, the intermeshing of the profiled superconducting wires 5 by means of the offset 19 of adjacent profiled side edges 12 and 13.

Figure 4:
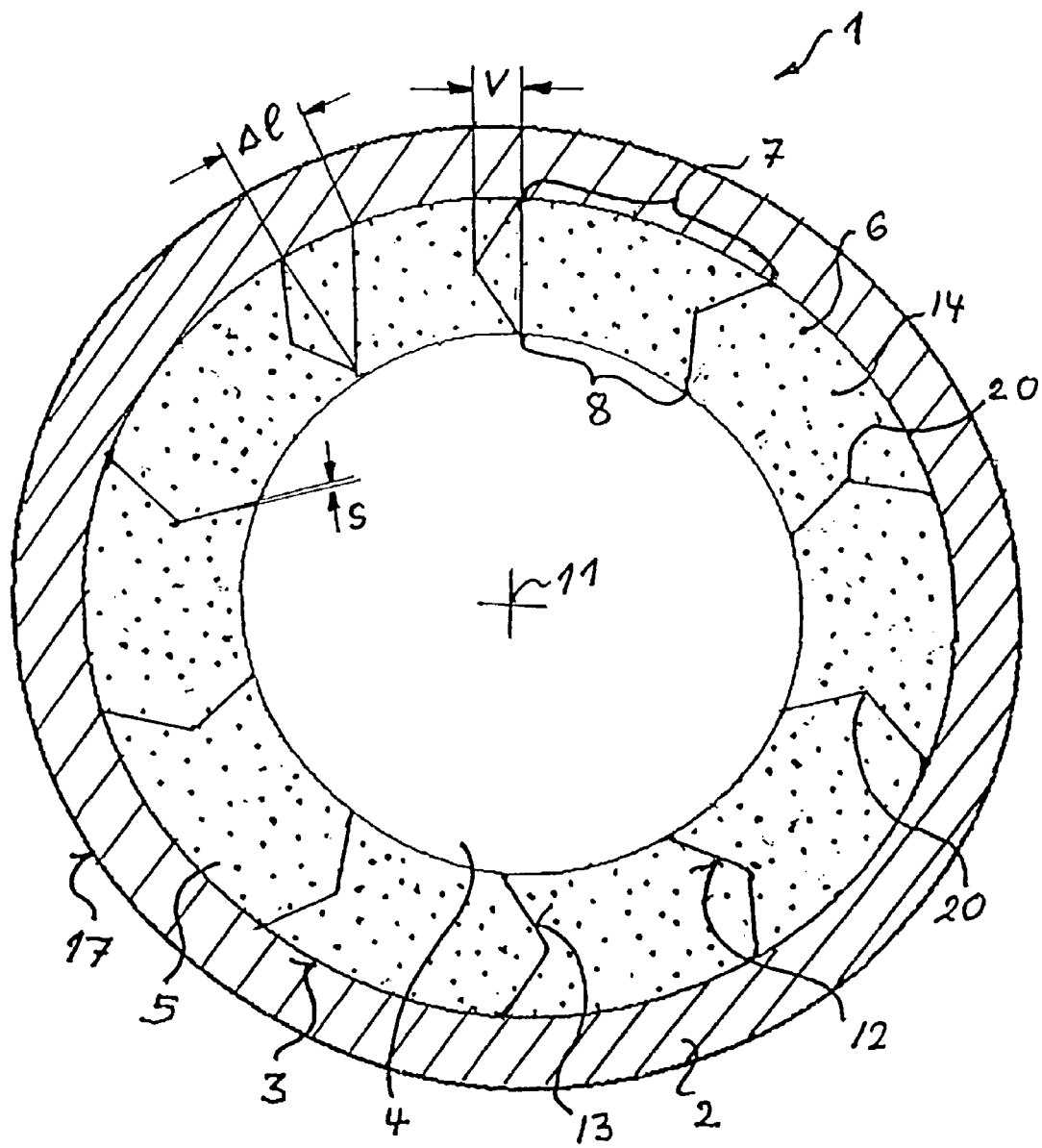
FIG. 4 shows a cross-section, in diagrammatic form, through a superconducting hollow cable according to a third embodiment of the invention.

FIG. 4 shows a cross-section, in diagrammatic form, through a superconducting hollow cable 1 according to a third embodiment of the invention. This third embodiment of the invention differs from the preceding embodiments in that the number of profiled superconducting wires 5 has been reduced from twenty in FIGS. 1 and 2 to ten in FIG. 4. The intermeshing of the profiled superconducting wires 5 is enhanced by means of the fact that the superconducting wires 5 have pointed profiles 20 on their profiled side edges 12 and 13. These pointed profiles 20 form an offset of magnitude v, which in co-operation with the difference in length l between the outer and inner regions 7 and 8 of curvature of the cross-sections of the profiled superconducting wires 5 increases the tolerance for the gap width s, so that a higher tolerance with respect to gap widths s that are formed can be permitted without the structure of the superconducting wires 5 arranged inside the outer tube 2 collapsing.

Figure 5:
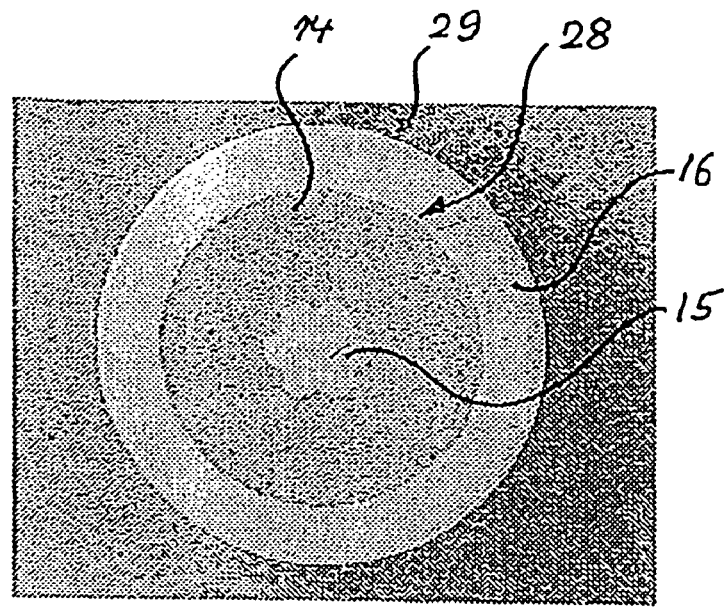
FIG. 5 shows a cross-section, in diagrammatic form, through the initial form of a superconducting wire before being provided with profiling.

FIG. 5 shows a cross-section, in diagrammatic form, through a superconducting multifilament wire in a standard arrangement. Such wires have a circular cross-section and comprise, as described hereinbefore, twisted superconducting filaments in a mere or less complex Cu matrix.

Figure 6:
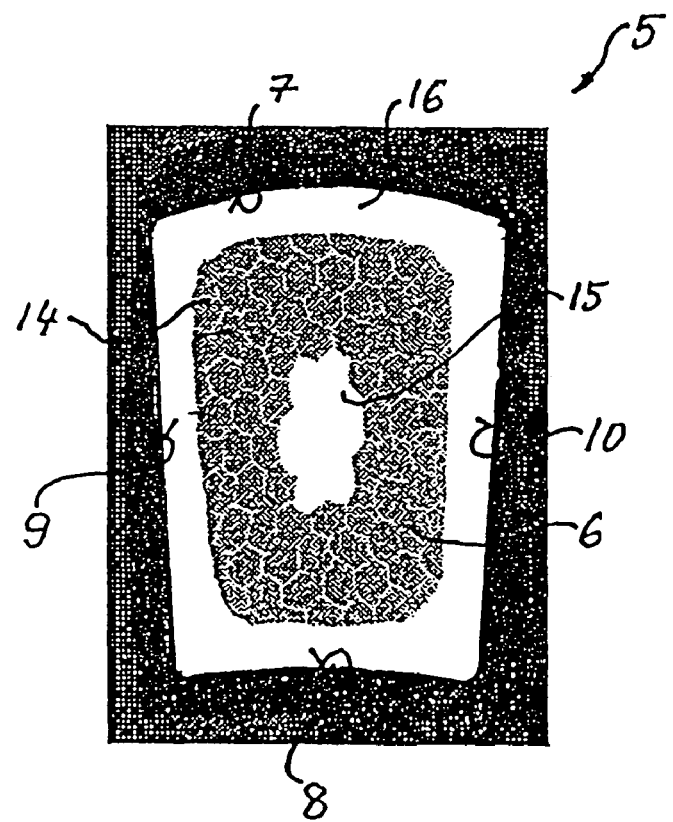
FIG. 6 shows a cross-section, in diagrammatic form, through a profiled superconducting wire after being provided with a profiled shape for a superconducting hollow cable of the first embodiment of the invention according to FIG. 1.

FIG. 6 shows a cross-section, in diagrammatic form, through a profiled superconducting wire 5 after being provided with a profiled shape for a superconducting hollow cable 1 of the first embodiment of the invention according to FIG. 1. In the course of being provided with that shape, a wire according to FIG. 5 is rolled, using different roller profiles, so that there are formed, on the one hand, an outer region 7 of curvature and, on the other hand, an inner region 8 of curvature. Furthermore, the side edges 9 and 10 are rolled by means of rollers set at an appropriate angle to one another. Instead of a rolling mechanism, drawing through an appropriate shape-providing drawing die can also be employed. In the case of this method, the round wire shown in FIG. 5 is re-shaped into a profiled superconducting wire 5 having a cross-section governed by the drawing die.

Figure 7:
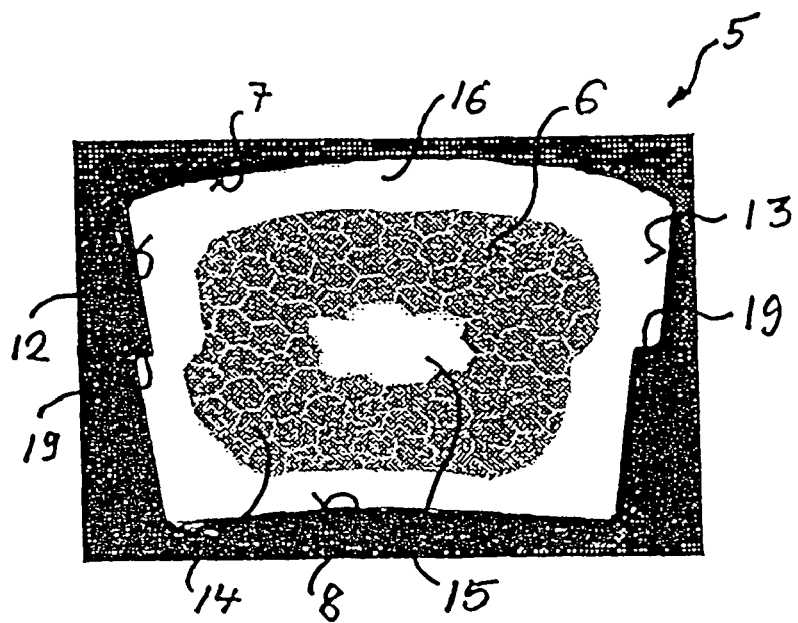
FIG. 7 shows a cross-section, in diagrammatic form, through a profiled superconducting wire after being provided with a profiled shape for a superconducting cable of the second embodiment of the invention according to FIG. 2.

FIG. 7 shows a cross-section, in diagrammatic form, through a profiled superconducting wire 5 after being provided with a profiled shape for a superconducting cable 1 of the second embodiment of the invention according to FIG. 2. Instead of smooth side edges as are still shown in FIG. 6, in the case of this profiling profiled side edges 12 and 13 are shaped or drawn through a drawing block. In the process there are formed stepped shoulders 19, which make possible intermeshing of the profiled superconducting wires 5 when the hollow cable is assembled.

Figure 8:
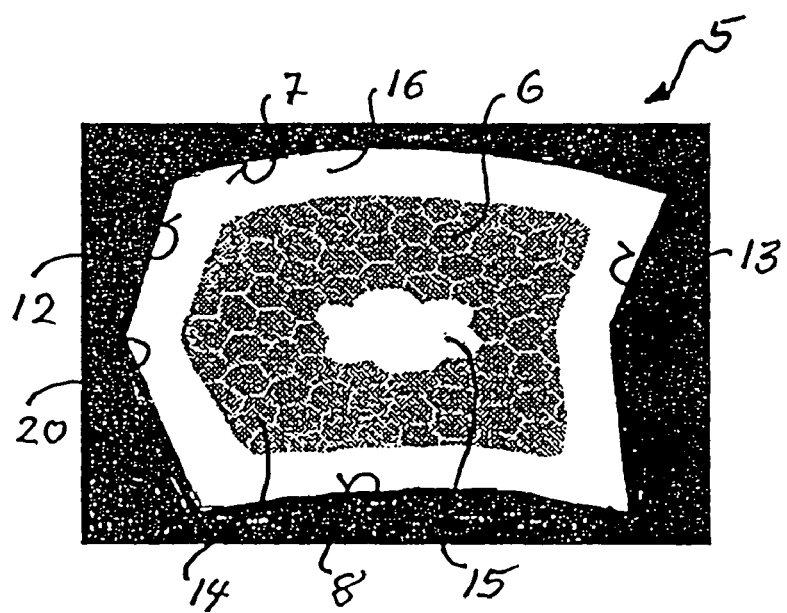
FIG. 8 shows a cross-section, in diagrammatic form, through a profiled superconductor after being provided with a profiled shape for a superconducting hollow conductor cable of the third embodiment of the invention.

FIG. 8 shows a cross-section, in diagrammatic form, through a profiled superconducting wire 5 after being provided with a profiled shape for a superconducting hollow cable 1 of the third embodiment of the invention according to FIG. 4. This profile too, which has a profile point 20 on the side edge 12, can be obtained by appropriate shaping of an initially circular cross-section as shown in FIG. 5. For the purpose, either four differently shaping profile rollers or a drawing orifice of appropriate shape can be used in order to produce the four profile edges of the cross-section of the profiled superconducting wires 5. An advantage of these profiled superconducting wires 5 of FIG. 8 over FIG. 7 is that an outwardly bulging pointed profile 20 of the profiled side edge 12 is easier to produce by means of profile rollers than is possible for the profile having a stepped shoulder 19 of FIG. 7 and that the intermeshing of those shapes contributes to the profiled superconducting wires' orienting themselves around the cooling channel.

FIG. 9 shows a cross-section, in diagrammatic form, through a superconducting hollow conductor cable 1 according to a fourth embodiment of the invention. Components having the same functions as in the preceding Figures are identified by the same reference symbols and not separately discussed. The difference from the preceding embodiments lies in the fact that, as the solidly constructed outer tube 2, there is selected an outer tube which, although having a cylindrical inner wall 3, has a square external contour 17, as a result of which, on the one hand, the strength of the outer tube 2 is increased and, on the other hand, the production of compact coils can be substantially simplified.

FIG. 10 shows cross-sections, in diagrammatic form, through two variants of a superconducting hollow conductor cable 1 according to a fifth embodiment of the invention. Components having the same functions as in the preceding Figures are identified by the same reference symbols and not separately discussed. The difference of this fifth embodiment of the invention differs from the preceding embodiments in that the outer tube 2 having a square external contour 17 has, in the corners of the square outer tube 2, additional cooling channels 18 in the longitudinal direction of the hollow cable 1. As a result, the cooling action can, as already described hereinbefore, be further intensified for this hollow cable 1.

Figure 11:
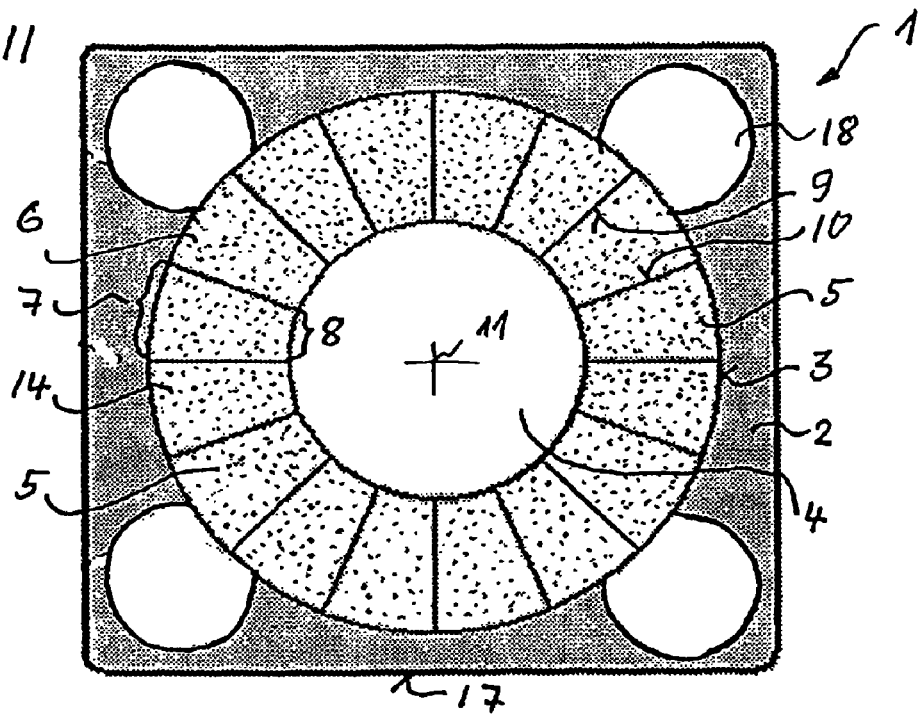
FIG. 11 shows a cross-section, in diagrammatic form, through a superconducting hollow cable according to a sixth embodiment of the invention.

FIG. 11 shows a cross-section, in diagrammatic form, through a superconducting hollow conductor cable 1 according to a sixth embodiment of the invention, reference numeral 5 denoting profiled superconducting wires, reference numeral 2 denoting the outer tube and reference numeral 18 denoting cooling channels in the outer tube 2 in the longitudinal direction of the latter. By virtue of these outer cooling channels 18, which extend along the inner wall of the outer tube and which have an opening to the bundle of profiled superconducting wires, the twisted profiled superconducting wires are accordingly additionally cooled from the outside in direct contact with the coolant after each quarter-turn of the helical displacement. In this variant too, all the wires are subject to absolutely identical electromagnetic, mechanical and thermal conditions.

Figure 12:
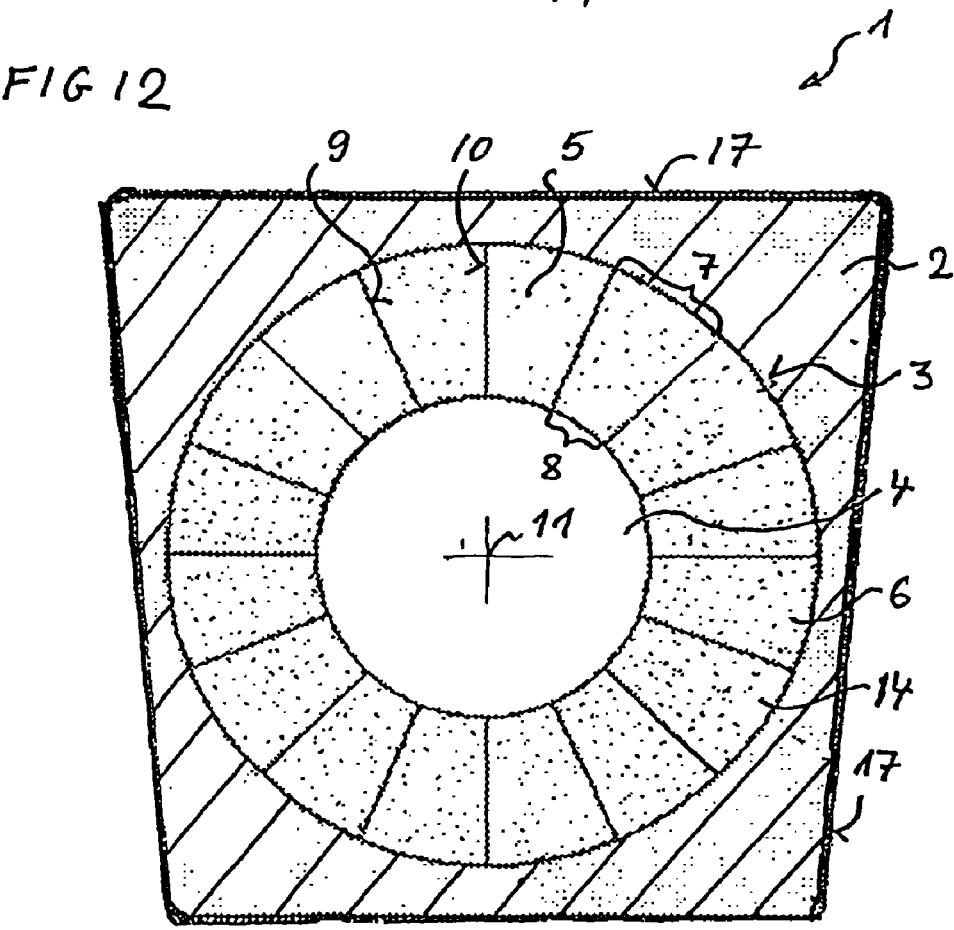
FIG. 12 shows a cross-section, in diagrammatic form, through a superconducting hollow cable according to a seventh embodiment of the invention.

FIG. 12 shows a cross-section, in diagrammatic form, through a superconducting hollow conductor cable 1 according to a seventh embodiment of the invention. The seventh embodiment of the invention differs from the preceding embodiments in that the outer tube 2 has a trapezoidal external contour 17. This trapezoidal external contour 17 can be advantageous when a plurality of these superconducting hollow cables 1 are assembled into a circular coil or when specific coil geometries have to be produced in a mechanically compact manner and in as stable a manner as possible.

Figure 13:
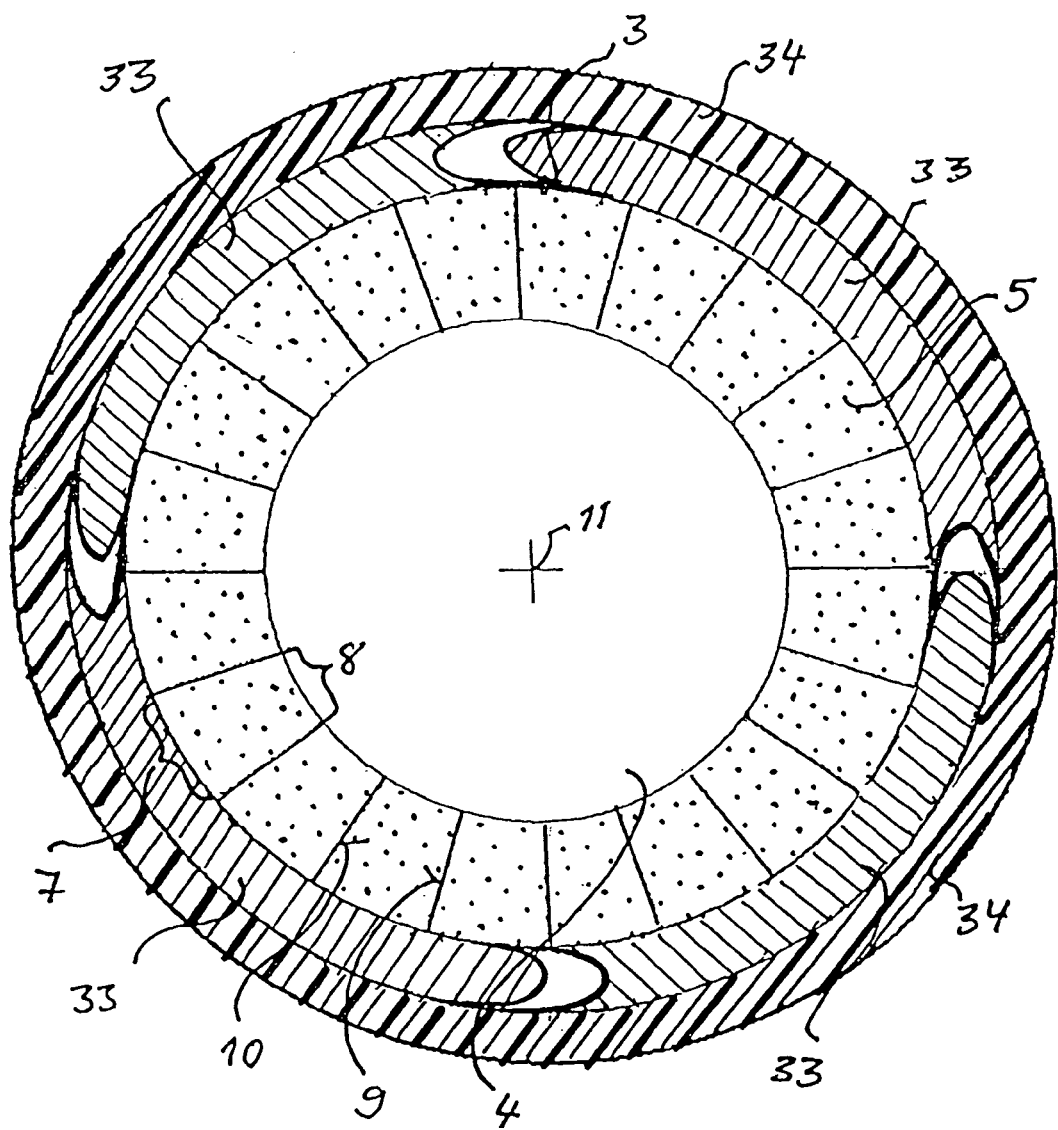
FIG. 13 shows a cross-section, in diagrammatic form, through a superconducting hollow cable according to an eighth embodiment of the invention.

FIG. 13 shows a cross-section, in diagrammatic form, through a superconducting hollow cable 1 according to an eighth embodiment of the invention. Components having the same functions as in the preceding Figures are identified by the same reference symbols and not separately discussed. The outer tube in this case is formed from two layers: a first layer having a tensioning wire 33, for example of NiCr, wound in a helical arrangement, and an electrically insulating, hermetically sealing outer layer 34, for example produced by means of polymerisation. As already described hereinbefore, this eighth embodiment of the invention differs from the preceding embodiments in that, instead of a solidly constructed outer tube, jacketing of the profiled superconducting wires is accomplished by means of tensioning wire wound in a helical arrangement, to which an electrically insulating, hermetically tight outer layer is subsequently applied.

Figure 14A:
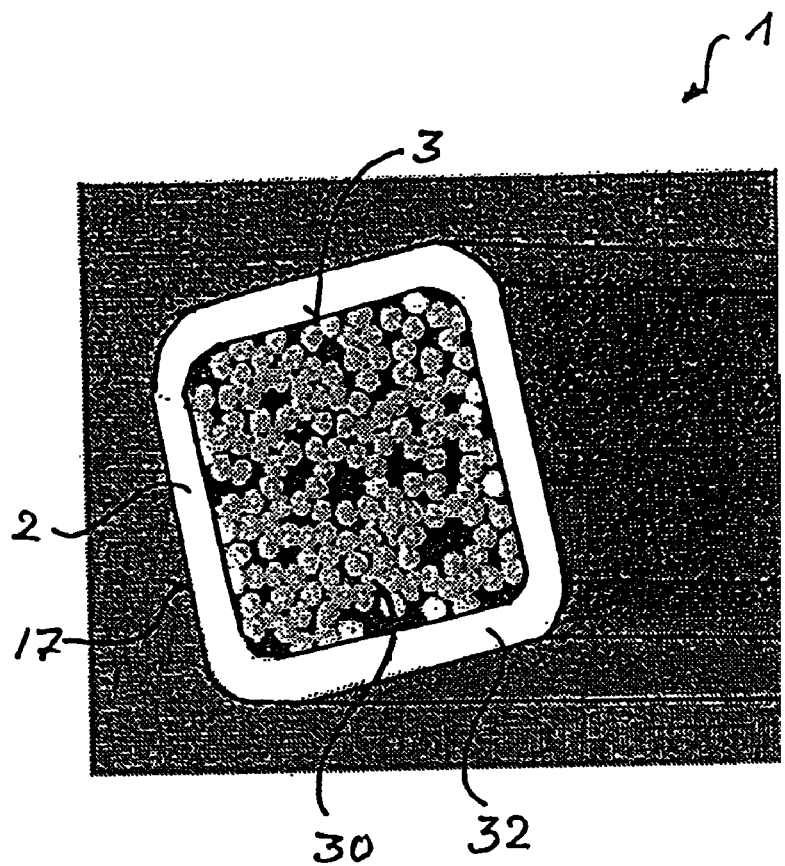
FIG. 14 shows, as FIG. 14a, a photograph and, as FIG. 14b, a drawing, in diagrammatic form, of a superconducting hollow cable of the CICC type in a standard arrangement
Figure 14B:
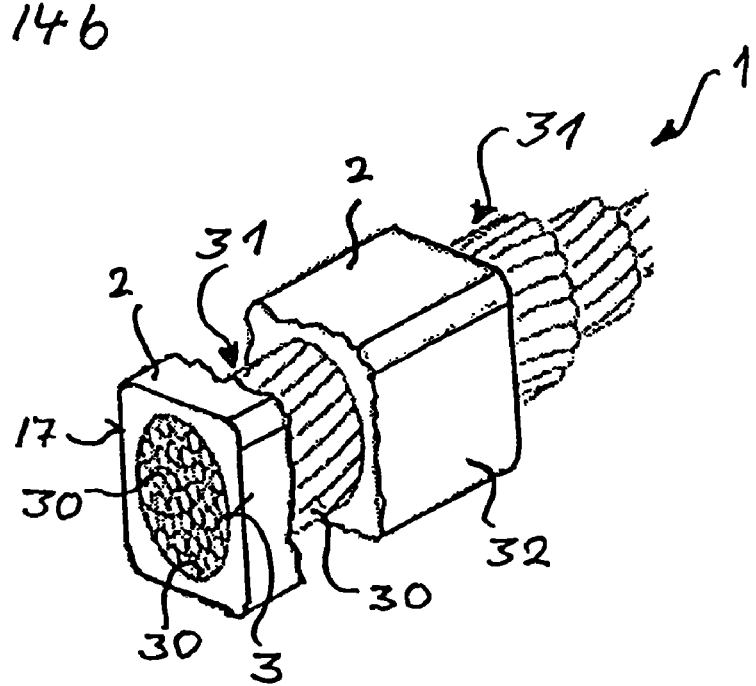

FIG. 14 shows, as FIG. 14a, a photograph and, as FIG. 14b, a drawing, in diagrammatic form, of a superconducting hollow cable of the CICC type in a standard arrangement. Components having the same functions as in the preceding Figures are identified by the same reference symbols and not separately discussed. FIG. 14 shows a bundle of twisted superconducting wires 30 running inside a hermetically tight tube 32.

Figure 15A:
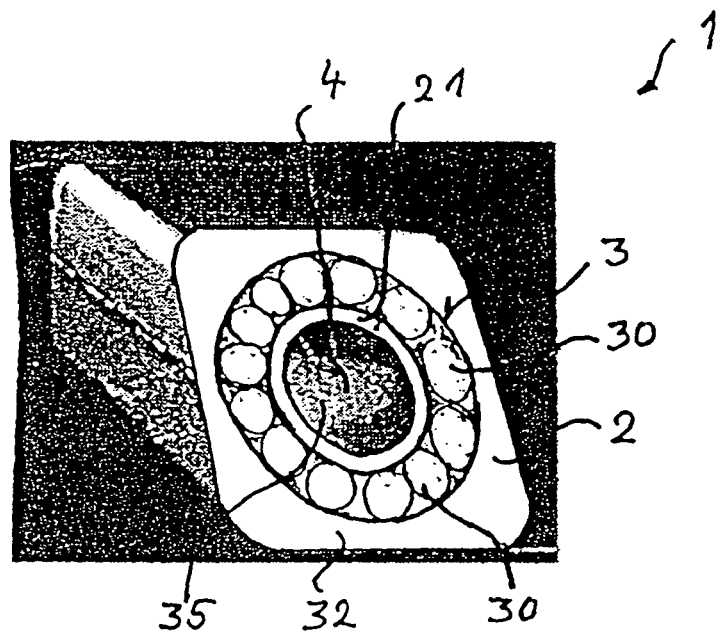
FIG. 15 shows, as FIG. 15 a, a photograph and, as FIG. 15 b, a cross-section, in diagrammatic form, through a superconducting hollow cable of the CICC type according to the prior art (POLO cable).
Figure 15B:
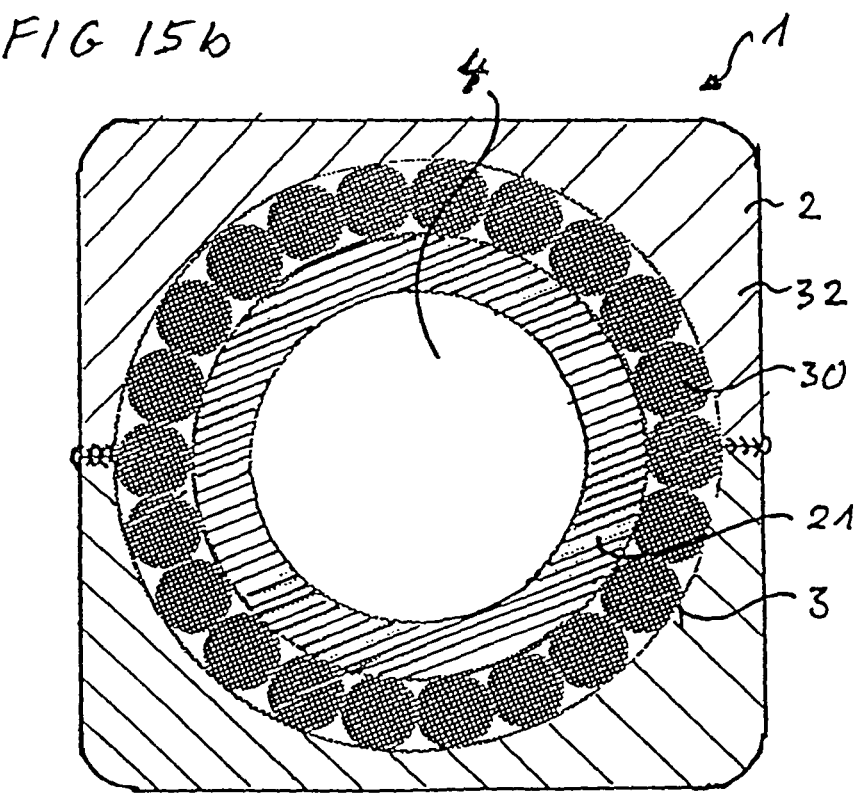
Figure 16A:
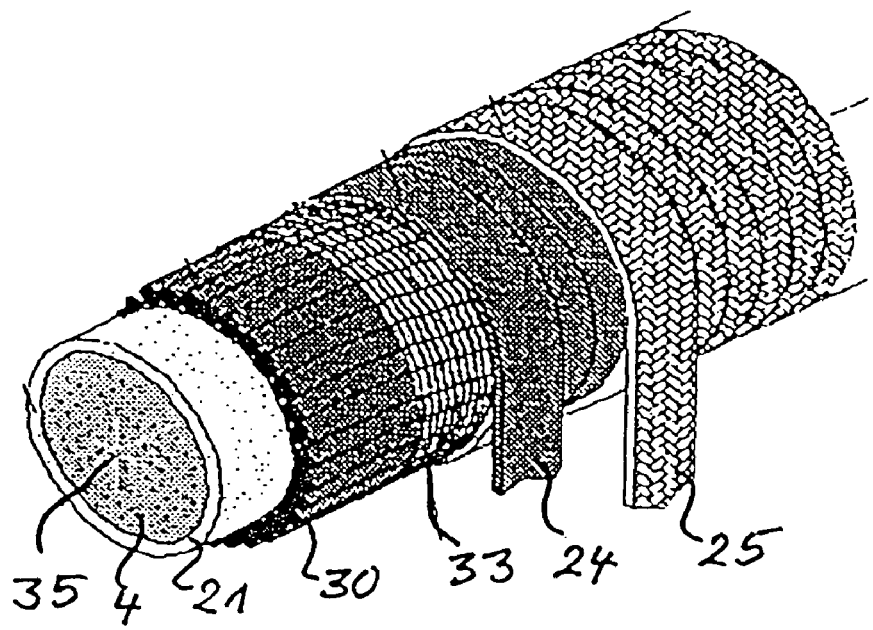
FIG. 16 shows, as FIG. 16 a, a photograph and, as FIG. 16 b, a drawing, in diagrammatic form, of a superconducting cable of the Nuclotron type in a standard arrangement.
Figure 16B:
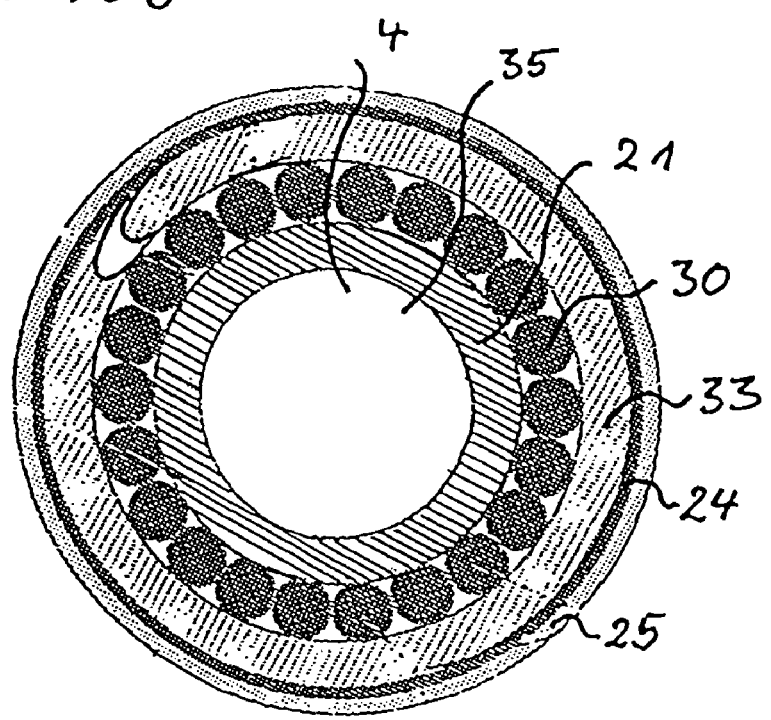

FIG. 15 shows, as FIG. 15a, a photograph and, as FIG. 15b, a cross-section, in diagrammatic form, through a superconducting hollow cable of the CICC type according to the prior art (POLO cable). Components having the same functions as in the preceding Figures are identified by the same reference symbols and not separately discussed. In this case, superconducting wires 30 are arranged on a solidly constructed inner tube 21 as an inner supporting tube, the inner cooling channel being provided for a two-phase helium stream and the direct passage of supercritical helium between the superconducting wires 30 being possible with a high resistance to flow. arrangement. Components having the same functions as in the preceding Figures are identified by the same reference symbols and not separately discussed. FIG. 16 shows, in a central cooling channel formed by a compact inner tube 21 of CuNi, two-phase helium 35 that is passed through therein. On the inner tube 21 there are wound-superconducting wires 30, which are held together by an NiCr tensioning wire 33. A Kapton tape 24 forms electrical insulation and a fibreglass tape 25 serves for thermal insulation of the superconducting hollow cable.

FIG. 17 shows a cross-section, in diagrammatic form, through a superconducting hollow cable 1 of the Nuclotron type in an improved arrangement. Components having the same functions as in the preceding Figures are identified by the same reference symbols and not separately discussed. FIG. 17 shows a central cooling channel 4 formed by a compact inner tube 21 of CuNi. On the inner tube 21 there are wound profiled superconducting wires 5, which are held together by an NiCr tensioning wire. An electrically insulating, hermetically tight outer layer 34 is arranged on the tensioning wire 33.

LIST OF REFERENCE SYMBOLS 1 superconducting hollow cable
2 outer tube
3 inner wall of outer tube
4 central cooling channel
5 profiled superconducting wire
6 superconducting filament
7 outer region of curvature
8 inner region of curvature
9 smooth side edge
10 smooth side edge
11 centre-point of cooling channel
12 profiled side edge
13 profiled side edge
14 superconducting filament
15 metallic core or centre of stabilising matrix of a superconducting multifilament conductor
16 jacket of the stabilising matrix of a superconducting multifilament conductor of a profiled wire
17 external contour of outer tube
18 cooling channels of the outer tube in a longitudinal direction
19 stepped shoulder (stepped profile)
20 pointed profile of a side edge
21 compact inner tube
24 Kapton tape
25 fibreglass tape
26 outer jacket of inner tube
27 inner wall of inner tube
28 bundle comprising superconducting filaments 29 wire from a bundle comprising superconducting filaments and stabilising matrix
30 superconducting wires
31 bundle of twisted superconducting wires
32 hermetically tight tube
33 tensioning wire wound in a helical arrangement
34 electrically insulating, hermetically sealing outer layer
35 two-phase helium
$l_{ak}$ length of outer region of curvature
$l_{ik}$ length of inner region of curvature
$\Delta l$ difference in length
s gap width
v magnitude of offset
n number of profiled superconducting wires per superconducting hollow cable
$r_a$ inner radius of outer tube
$r_i$ radius of central cooling channel

The invention claimed is:

1. Superconducting hollow cable having the following features:
   an outer tube having a circular inner cross-section and a cylindrical inner wall;
   a central cooling channel having a polygonal or circular cross-section which is smaller than the inner cross-section of the outer tube and the central cooling channel being configured for a flow of a cooling medium;
   profiled superconducting wires which are arranged between the inner wall and the cooling channel and which comprise at least one superconducting filament and which have a cross-sectional profile of a key stone of a Roman stone bridges or a groin vaults,
   the cross-sectional profile of the profiled superconducting wires having an outer region of curvature which is matched to the polygonal or circular inner cross-section of the outer tube, and the cross-sectional profile of the profiled superconducting wires having side edges which are oriented towards the centre-point of the cooling channel; wherein
   the profiled superconducting wires are arranged on the inner wall of the outer tube;
   the cross-sectional profile of the profiled superconducting wires has an inner region of curvature which is matched to the circular cross-section of the cooling channel;
   the profiled superconducting wires form, by their inner regions of curvature, the cylindrical cooling channel of the superconducting hollow cable, said wires being arranged with their radially oriented side edges so tightly against one another and with their outer regions of curvature so tightly on the inner wall of the outer tube that they can hold themselves in position by a shape-based and force-based fit and maintain the cooling channel at operating temperatures of the superconducting hollow cable.

2. Superconducting hollow cable according to claim 1, wherein the sum of gap widths of radial gap formations between the profiled superconducting wires is, at operating temperatures of the superconducting hollow cable, smaller than the difference, in length between the outer and inner regions of curvature of an individual profiled superconducting wire.

3. Superconducting hollow cable according to claim 1, wherein
   the profiled superconducting wires (5) have intermeshing profiled side edges (12, 13).

4. Superconducting hollow cable according to claim 1, wherein
   the profiled superconducting wires (5) have special surface coatings or partial high-resistance jacketing means in order to reduce eddy current effects and thermal losses.

5. Superconducting hollow cable according to claim 1, wherein
   the profiled superconducting wires (5) are twisted around the central cooling channel.

6. Superconducting hollow cable according to claim 1, wherein the profiled superconducting wires have ceramic superconductors or high-temperature superconductors.

7. Superconducting hollow cable according to claim 1, wherein the outer tube has a circular, square or trapezoidal external contour.

8. Superconducting hollow cable according to claim 1, wherein
   the outer tube (2) comprises cooling channels (18) in its longitudinal direction.

9. Superconducting hollow cable according to claim 1, wherein the coefficient of thermal expansion of the material of a compact outer tube is greater than the coefficient of thermal expansion of the profiled superconductors.

10. Superconducting hollow cable according to claim 1, wherein the at least one superconducting filament of each superconducting wire is a plurality of superconducting filaments in a copper matrix.

11. Superconducting hollow cable according to claim 1, further comprising a cooling medium disposed within the central cooling channel.

12. Superconducting hollow cable according to claim 11, wherein the cooling medium is in direct contact with the superconducting wires.

* * * * *